US008829450B2

(12) United States Patent
Kim et al.

(10) Patent No.: US 8,829,450 B2
(45) Date of Patent: Sep. 9, 2014

(54) METHOD AND APPARATUS FOR ACQUIRING IMAGES CREATED BY PENETRATION OF RADIOACTIVE RAY

(75) Inventors: Sung Su Kim, Yongin-si (KR); Young Hun Sung, Hwaseong-si (KR); Jong Ha Lee, Hwaseong-si (KR); Dong-Goo Kang, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 672 days.

(21) Appl. No.: 12/461,868

(22) Filed: Aug. 26, 2009

(65) Prior Publication Data
US 2010/0155606 A1    Jun. 24, 2010

(30) Foreign Application Priority Data

Dec. 19, 2008  (KR) .................. 10-2008-0129968

(51) Int. Cl.
*G01T 1/20* (2006.01)
*G01T 1/00* (2006.01)

(52) U.S. Cl.
CPC .................................. *G01T 1/00* (2013.01)
USPC .................................. 250/368; 250/370.11

(58) Field of Classification Search
USPC ............................................ 250/368, 370.11
See application file for complete search history.

(56) References Cited

U.S. PATENT DOCUMENTS

| 4,110,621 A | 8/1978 | Horn |
| 4,316,817 A | 2/1982 | Cusano et al. |
| 4,533,489 A * | 8/1985 | Utts et al. ................ 252/301.17 |
| 5,241,180 A * | 8/1993 | Ishaque et al. ............ 250/361 R |
| 5,514,870 A | 5/1996 | Langenbrunner |
| 5,773,829 A * | 6/1998 | Iwanczyk et al. ............. 250/367 |
| 2001/0038076 A1* | 11/2001 | Kuwabara ................ 250/370.11 |
| 2003/0020044 A1* | 1/2003 | Lyons et al. ................ 252/301.5 |
| 2005/0280012 A1* | 12/2005 | Boettiger et al. ............... 257/88 |
| 2006/0138335 A1 | 6/2006 | Vogtmeier et al. |
| 2006/0202128 A1* | 9/2006 | Berger et al. ............ 250/370.11 |

FOREIGN PATENT DOCUMENTS

| JP | 05-034463 | 2/1993 |
| JP | 05-072344 | 3/1993 |
| JP | 05-269123 | 10/1993 |
| JP | 2000-035480 | 2/2000 |
| JP | 2000-193749 | 7/2000 |
| JP | 2000-235079 | 8/2000 |
| JP | 2006-519377 | 8/2006 |
| KR | 10-2006-0112336 | 11/2006 |
| WO | 2004/068168 A1 | 8/2004 |

OTHER PUBLICATIONS

Wang et al. Passive materials for high-frequency ultrasound transducers, Proceedings of SPIE 3664 (Jun. 1999), pp. 35-42).*
Office Action mailed Jul. 26, 2012 in U.S. Appl. No. 13/495,322.

(Continued)

*Primary Examiner* — David Porta
*Assistant Examiner* — Shun Lee
(74) *Attorney, Agent, or Firm* — Staas & Halsey LLP

(57) ABSTRACT

Disclosed is an apparatus and method of acquiring images created by penetration of a radioactive ray. The apparatus includes a scintillator to generate a light signal in response to an irradiated radioactive ray, and to change an advancing direction of the generate light signal, a light receiving unit to receive the light signal whose advancing direction is changed, and a signal processing unit to convert the received light signal into an electrical signal, and acquire an image corresponding to the penetrated irradiated radioactive ray based on the converted electrical signal.

8 Claims, 5 Drawing Sheets

(56) References Cited

OTHER PUBLICATIONS

Office Action mailed Nov. 13, 2012 in U.S. Appl. No. 13/495,322.
U.S. Office Action mailed Jun. 27, 2013 in related U.S. Appl. No. 13/495,322.
1 U.S. Office Action issued in related U.S. Appl. No. 13/495,322; mailed Mar. 24, 2014.
U.S. Office Action issued in related U.S. Appl. No. 13/495,322; mailed Oct. 10, 2103.
U.S. Notice of Allowance mailed Jun. 17, 2014 in related U.S. Appl. No. 13/495,322.

* cited by examiner

METHOD AND APPARATUS FOR ACQUIRING IMAGES CREATED BY PENETRATION OF RADIOACTIVE RAY

CROSS-REFERENCE TO RELATED APPLICATIONS

This application claims the priority benefit of Korean Patent Application No. 10-2008-0129968, filed on Dec. 19, 2008, in the Korean Intellectual Property Office, the disclosure of which is incorporated herein by reference.

BACKGROUND

1. Field

Exemplary embodiments relate to an apparatus and method of acquiring images created by penetration of a radioactive ray, which may generate a light signal from an irradiated radioactive ray, and change an advancing direction of the generated light signal to condense the generated light signal in a light receiving unit, thereby improving a quality of the penetration images with respect to a target of inspection/examination.

2. Description of the Related Art

An X-ray may be a short wavelength-electromagnetic wave generated such that electron rays emitted from a cathode at a high speed are collided with a heavy metal, and the X-ray may have a fluorescent effect and an excellent light transmissivity with respect to an object. Accordingly, the invisible X-ray may be changed to a visible ray, and may be used in photographing on a photograph film. Also, the X-ray may photograph changes in a density, a thickness, and the like of a target of inspection/examination (hereinafter inspection target) using a phenomenon that a part of the X-ray introduced to the inspection target is absorbed in the inspection target resulting in attenuation of the X-ray. An excellent penetrating power of the X-ray with respect to an object has gained an interest as a main feature of the X-ray since the time of discovery of the X-ray, and applications of the penetrating power of the X-ray have been attempted in medical/industrial fields such as hair loss treatment, and the like. The X-ray has been more widely utilized since Sir W. H. Bragg and his son Sir W. L. Bragg developed an X-ray diffraction method in 1913 through their analysis of a crystal structure, and William Coolidge developed a thermionic X-ray tube (Coolidge X-ray tube) in 1913, which may increase/reduce an amount or penetrating power of the X-ray. Thereafter, with a development in experiments and laboratory equipments, the X-ray is able to detect a macroscopic internal structure of an object and a microscopic structure of atoms of a material.

By acquiring the X-ray introduced to the inspection target as images, which is one of outstanding characteristics of the X-ray, various inspections/examinations with respect to the inspection target may be conducted.

The X-ray may be utilized for medical purposes in a chest X-ray, ultrasonography, computed tomography (CT), magnetic resonance imaging (MRI), and the like. The X-ray may also be utilized for industrial purposes in internal inspection for a circuit element, facility of equipments, a nondestructive inspection such as for water leakage detecting, and the like.

Images created by penetration of the X-ray widely used in all industries may be inferior in terms of image efficiency, as compared with efficiency of the irradiated X-ray, despite their widespread applications. For example, there is a significant disadvantage of the X-ray efficiency in that only about 30% of the irradiated X-ray may be materially used in acquiring images. Accordingly, there is a need for a technique of acquiring images created by penetration of the X-ray, in which the X-ray is effectively received to acquire the images having a relatively higher contrast even using a relatively small amount of exposure of the X-ray.

SUMMARY

Additional aspects will be set forth in part in the description which follows and, in part, will be apparent from the description, or may be learned by practice of the disclosure.

According to an aspect of exemplary embodiments, there is provided an apparatus to acquire images created by penetration of a radioactive ray, the apparatus including: a scintillator to generate a light signal in response to an irradiated radioactive ray, and to change an advancing direction of the generate light signal; a light receiving unit to receive the light signal whose advancing direction is changed; and a signal processing unit to convert the received light signal into an electrical signal, and acquire an image corresponding to the penetrated irradiated radioactive ray based on the converted electrical signal.

According to an aspect of exemplary embodiments, there is provided a method of acquiring images created by penetration of a radioactive ray, the method including: receiving an irradiated radioactive ray; generating a light signal in response to the received radioactive ray; changing an advancing direction of the generated light signal; and receiving the light signal whose advancing direction is changed to convert the received light signal into an electrical signal; and acquiring an image corresponding to the irradiated radioactive ray based on the converted electrical signal, wherein converting the received light signal into the electrical signal and acquiring the image are performed using at least one processor.

BRIEF DESCRIPTION OF THE DRAWINGS

These and/or other aspects of exemplary embodiments will become apparent and more readily appreciated from the following description, taken in conjunction with the accompanying drawings of which.

DETAILED DESCRIPTION

Figure 1:
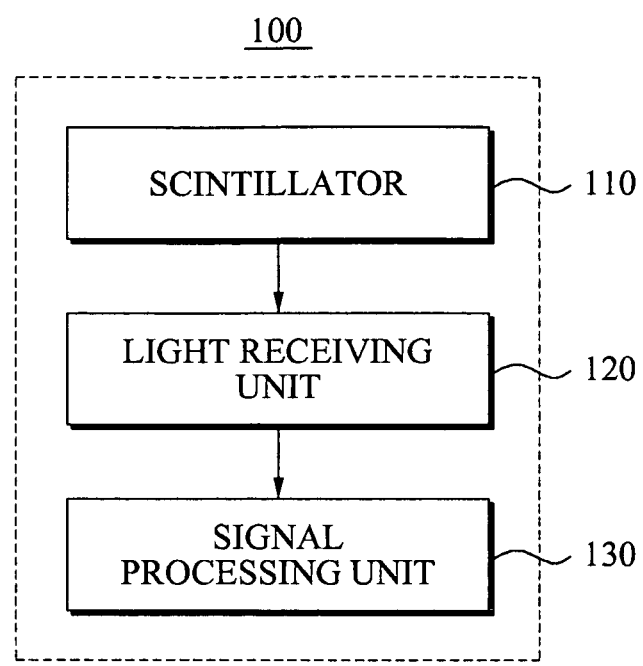
FIG. 1 is a block diagram illustrating an apparatus of acquiring images created by penetration of a radioactive ray according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a block diagram illustrating an apparatus 100 of acquiring images created by penetration of a radioactive ray according to an exemplary embodiment.

Referring to FIG. 1, the apparatus 100 according to the present exemplary embodiment includes a scintillator 110, a light receiving unit 120, and a signal processing unit 130.

The scintillator 110 may generate a light signal in response to an irradiated radioactive ray, and change an advancing direction of the generated light signal.

The radioactive ray used throughout the present specification may be signals generated when elements with a relatively large atomic weight such as uranium and plutonium are disintegrated into an unstable state due to a heavy nucleus, and may be comprehended as including at least one of alpha rays, beta rays, and X-rays.

The present exemplary embodiment may be applicable in a field where images created by penetration of the X-ray are acquired, and thus 'X-ray' may be hereinafter used instead of using 'radioactive ray' for the convenience of description.

The scintillator 110 may generate the light signal in response to an irradiated X-ray. Specifically, when the X-ray is irradiated to the scintillator 110, the scintillator 110 may excite atoms or molecules through an interaction with constituent elements of the scintillator 110, and also generate, as a light (light signal), an energy obtained when the excited atoms or molecules return to an original state.

The scintillator 110 may be configured with elements having a high density, a high atomic number, and a large volume based on efficiency in radiation-variation, a light transmissivity, a time of radiation-attenuation, and the like. The scintillator 110 according to an exemplary embodiment may be generated using at least one medium including at least one of NaI(Tl), CsI(Tl), LiI(Eu), ZnS(Ag), anthracene, plastics, and a liquid.

Also, the scintillator 110 may change an advancing direction of the light signal generated in response to the irradiated X-ray. The scintillator 110 according to an exemplary embodiment may change the advancing direction of the generated light signal to a direction of the light receiving unit 120.

The light receiving unit 120 may sense a light signal, and receive light signals transmitted using a light receiving sensor such as a PIN diode and the like. Accordingly, the scintillator 110 may change the advancing direction of the generated light signal so that the generated light signal is condensed in the light receiving unit 120 to the maximum extent.

In order to condense the light signal in the light receiving unit 120 as much as possible, the scintillator 110 according to an exemplary embodiment may change the advancing direction of the light signal to the direction of the light receiving unit 120.

For example, a side surface of the scintillator 110, adjacent to the light receiving unit 120, may be formed into a concave shape, so that the scintillator 110 changes the advancing direction of the light signal to the direction of the light receiving unit 120. In this exemplary embodiment, the scintillator 110 may include a medium having a density different from a density of the surrounding air. Specifically, the light signal passing through the concave shape of the scintillator 110 may be condensed in the light receiving unit 120 by the concave shape, whereby an amount of the light signal received by the light receiving unit 120 may approach an amount of exposure of the initially irradiated X-ray.

Similarly, the scintillator 110 may include a medium having a density different from a density of the surrounding air, and a side surface of the scintillator 110, exposed to the irradiated X-ray, may be formed into a convex shape.

According to an exemplary embodiment, the light receiving unit 120 may be formed on any one side of the scintillator 110 that is different from a middle portion thereof based on an array of other elements. In this case, the concave shape of the scintillator 110 for light condensing may be laterally asymmetrical with respect to a location of the light receiving unit 120. This will be hereinafter described in detail with reference to FIGS. 2 to 4.

For another example, the scintillator 110 may be formed of two mediums with densities different from each other, and, due to a difference in the densities of the two mediums, may change the advancing direction of the generated light signal. In this exemplary embodiment, the advancing direction of the generated light signal may be changed to a direction where the light receiving unit 120 is located due the difference in the densities.

For example, a medium collecting an initial X-ray to generate a light signal may be denoted as a first medium, and a medium changing the advancing direction of the generated light signal may be denoted as a second medium. The second medium may be formed into a concave shape as described above. The second medium may be formed into any shape capable of changing the advancing direction of the generated light signal to the direction of the light receiving unit 120 based on the difference in the densities as well as the concave shape. In this exemplary embodiment, at least one of a type of the first medium, a type of the second medium, and a shape of the second medium may be determined considering a production environment including costs, technologies, and the like.

When the light signal generated from the X-ray is condensed in the light receiving unit 120, the signal processing unit 130 may convert the condensed light signal into an electrical signal, and acquire a penetration image of an inspection target corresponding to the irradiated X-ray based on the converted electrical signal.

The apparatus 100 of acquiring images created by penetration of a radioactive ray according to an exemplary embodiment may include a plurality of scintillators and a plurality of light receiving units corresponding to each of the plurality of scintillators, and the signal processing unit 130 may combine light signals collected by the plurality of light receiving units to acquire the penetration image of the inspection target.

Consequently, the apparatus 100 according to the present exemplary embodiment may condense, in the light receiving unit 120, a great part of the light signals generated by the scintillator 110, thereby acquiring a clear penetration image with a high contrast even using a relatively small amount of exposure.

Also, by using the apparatus 100 according to the present exemplary embodiment, damage incurred by the inspection target due to the radioactive ray may be minimized, and costs of maintenance incurred due to exposure may be reduced by the relatively small amount of exposure.

Hereinafter, exemplary embodiments of the apparatus 100 of acquiring images created by penetration of a radioactive ray described in FIG. 1 will be described in detail.

Figure 2:
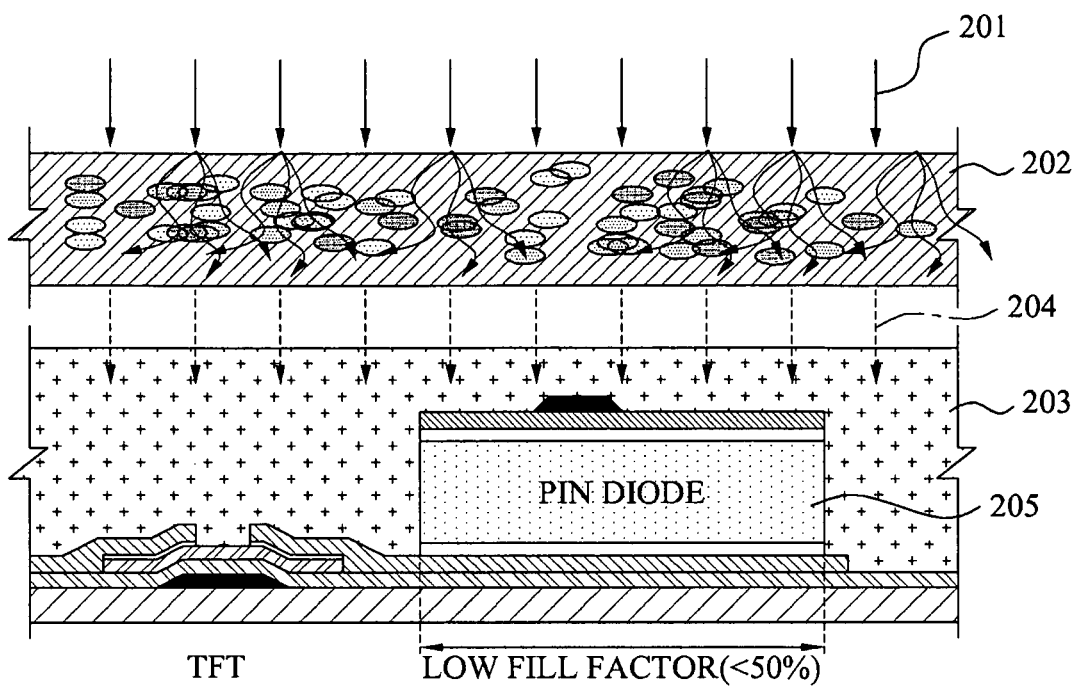
FIGS. 2 to 4 illustrate examples in which an apparatus of acquiring images created by penetration of a radioactive ray is applied according to an exemplary embodiment.
Figure 3:
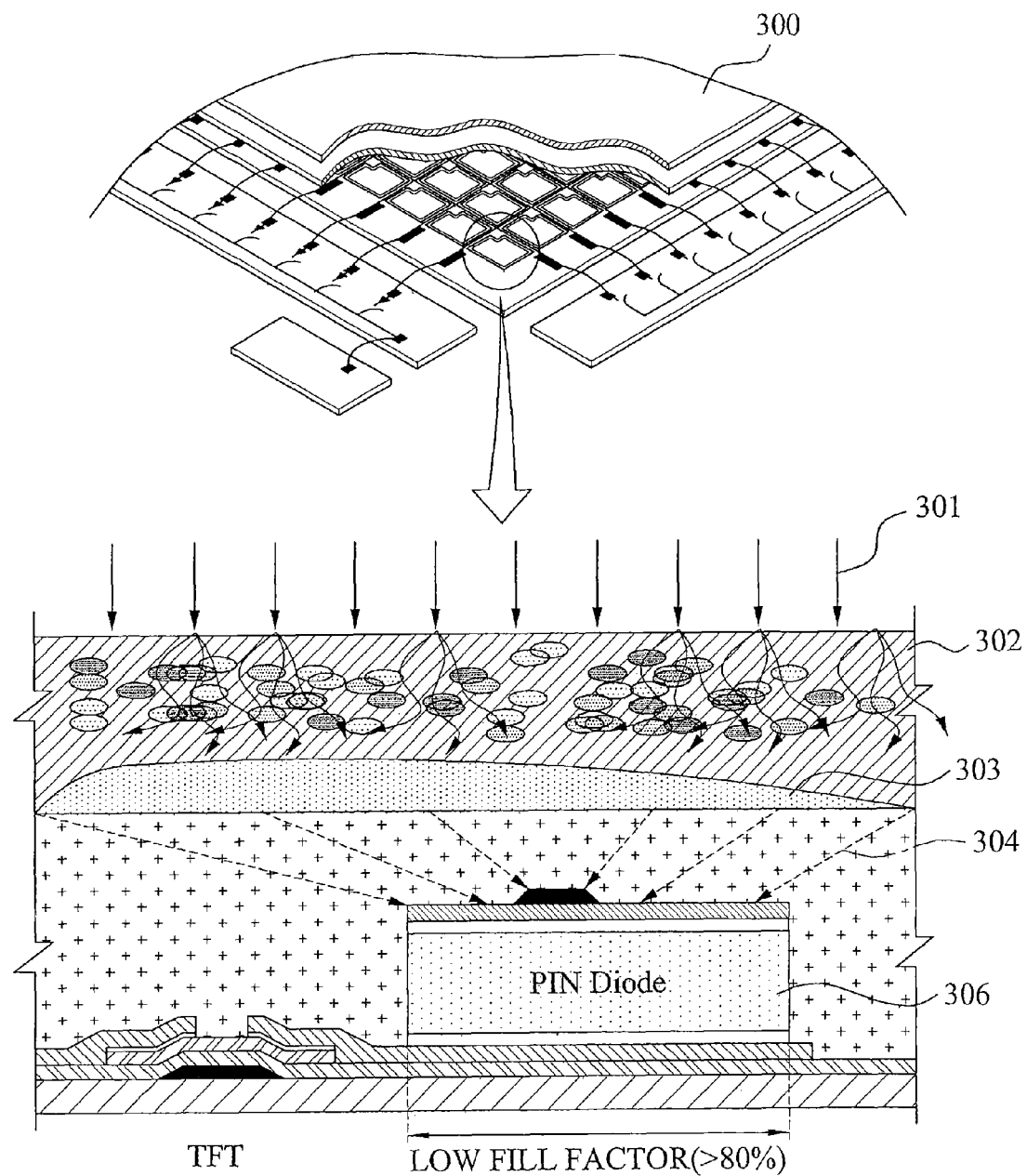
Figure 4:
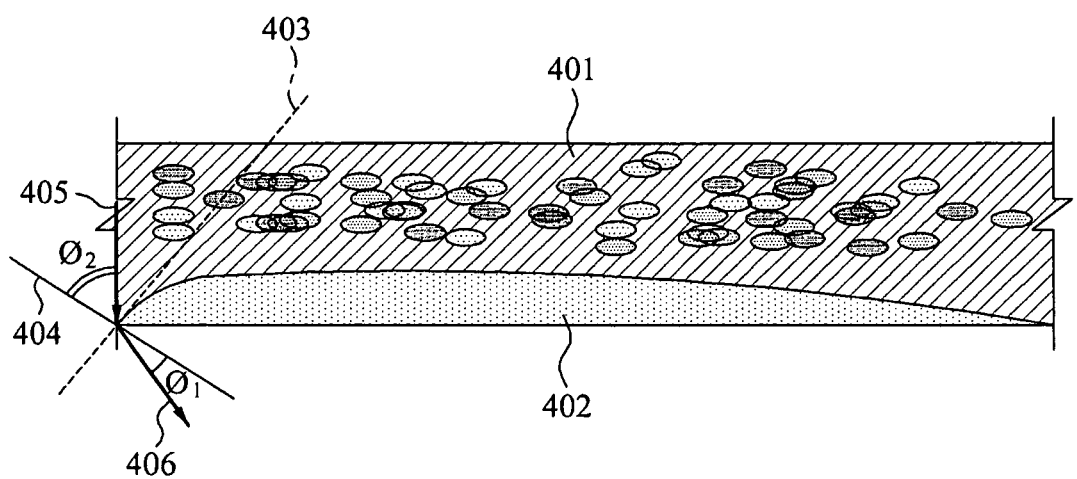

FIGS. 2 to 4 illustrate examples in which an apparatus 300 of acquiring images created by penetration of a radioactive ray is applied according to exemplary embodiments.

Referring to FIG. 2, an irradiated X-ray 201 may enter a side of a scintillator 202, and the entered X-ray may be converted into a light signal 204 in the scintillator 202. Converting the irradiated radioactive ray into the light signal may be a general technique of the scintillator, and thus detailed descriptions thereof will be herein omitted.

Also, a part of the converted light signal 204 may enter another medium 203 different from the scintillator 202, and a part of the converted light signal 204 may be condensed in a light receiving unit 205 surrounded by the other medium 203. In this exemplary embodiment, to increase an amount of the light signal 204 condensed in the light receiving unit 205, a shape of the scintillator 202 may be changed.

Referring to FIG. 3, the apparatus 300 of acquiring images created by penetration of a radioactive ray according to the present exemplary embodiment may be divided by a plurality of unit cells, and each of the unit cells may include a scintillator 302 and a light receiving unit 306. The light signal condensed for each of the unit cells may be processed in the signal processing unit, and then restored to a penetration image.

The unit cells may be specifically described with reference to elements 301 to 306.

An irradiated X-ray 301 may enter a side of the scintillator 302, and the entered X-ray 301 may be converted into a light signal 304 in the scintillator 302. In this exemplary embodiment, the converted light signal may enter a medium 303 having a density different from a density of the scintillator 302, and an advancing direction of the light signal 304 may be changed. The medium 303 which will be hereinafter described in detail may have a material type or an immaterial type. The medium 303 of the material type may include at least one of elements including NaI(Tl), CsI(Tl), LiI(Eu), ZnS(Ag), anthracene, plastics, and a liquid, and any element other than the above-mentioned elements may be used as long as the element may change the advancing direction of the light signal.

Also, the medium 303 of the immaterial type may designate a vacuum or air, and may be understood as a space generated such that a side of the scintillator 302 is vacant as in a cavity, that is, the side thereof is deformed.

First, when the medium 303 is understood as the vacuum or air, the advancing direction of the light signal 304 may be changed according to a formed shape of the scintillator 302. Specifically, a side surface of the scintillator 302 adjacent to the light receiving unit 306 may be formed into a concave shape, so that the advancing direction of the light signal generated inside the scintillator 302 is changed to a direction of the light receiving unit 306. According to the present exemplary embodiment, the side surface of the scintillator 302 formed into the concave shape may be as described above, however, any shape of the scintillator 302 capable of effectively condensing the light signal in the light receiving unit 306 may be used.

For another example, in a case of the medium 303 of the material type, the advancing direction of the generated light signal may be changed to the direction of the light receiving unit 306 depending on a density of the medium 303 or the concave shape.

In cases of the medium 303 of material/immaterial types, a shape of the medium 303 may be laterally asymmetrical with respect to a location of the light receiving unit 306. This will be described in detail with reference to FIG. 4.

Referring to FIG. 4, in a scintillator 401, an angle $\emptyset_1$ between a tangent line 403 and a line 404 in a specific part of a concave shape 402 (or a second medium) with respect to an advancing direction 405 of a condensed X-ray and an angle $\emptyset_2$, between the line 404 and an advancing direction 406 of the light signal generated due to the concave shape 402 may be represented through Equation 1 below by Snell's law, which is $$N2 * \sin \emptyset_1 = N1 * \sin \emptyset_2,$$ [Equation 1]

wherein N1 represents a refractive index of a material used in the concave shape 402, and N2 represents a refractive index of the scintillator 401. When $\emptyset_2$ is 70°, the refractive index of the concave shape 402 is 1, and the refractive index of the scintillator 401 is 1.8, $\emptyset_1$ may be calculated as 32°. Consequently, the apparatus of acquiring images created by penetration of a radioactive ray according to the present exemplary embodiment may condense light signals as much as possible in the light receiving unit formed on a side of the apparatus.

The scintillator 401 may be formed into a circular arc shape, which is laterally symmetrical, when the light receiving unit, that is, a condensed point being located in a middle portion of the apparatus, and a side of the concave shape 402, as shown in FIG. 4, may be formed into a deformed shape when the condensed point is positioned to one side. Also, a degree of the deformed shape of the concave shape 402 may be determined based on Equation 1.

Figure 5:
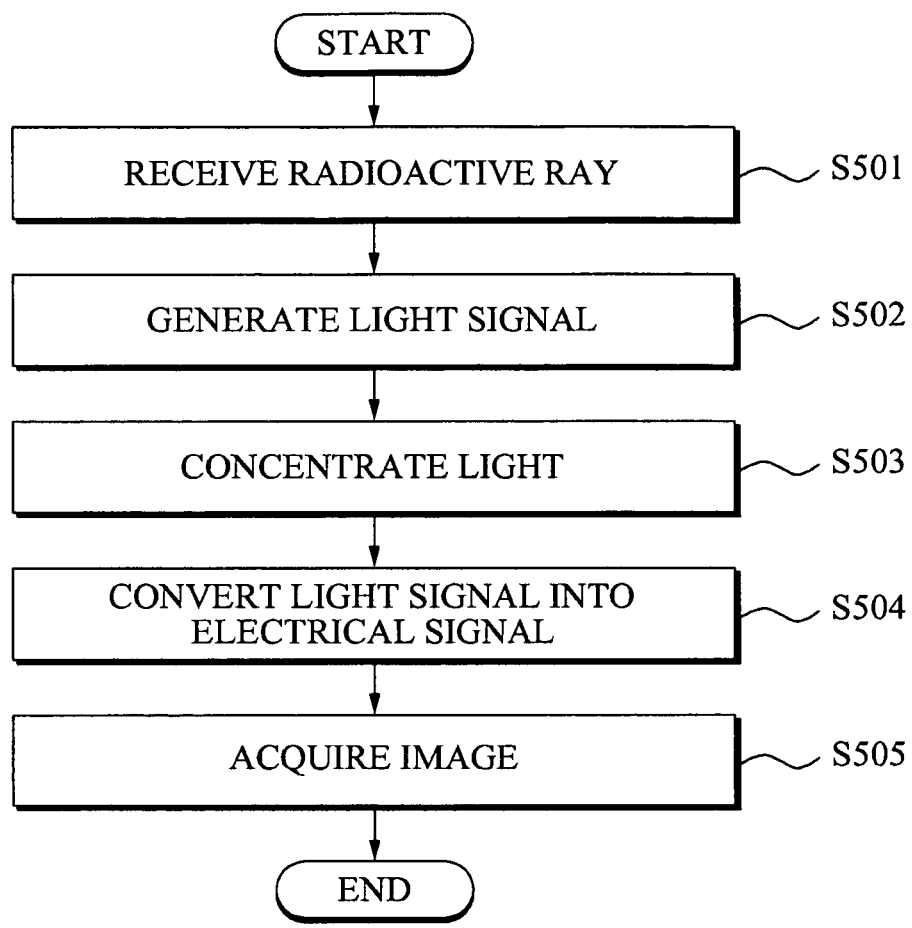
FIG. 5 is a flowchart illustrating a method of acquiring images created by penetration of a radioactive ray according to an exemplary embodiment.

FIG. 5 is a flowchart illustrating a method of acquiring images created by penetration of a radioactive ray according to an exemplary embodiment.

Referring to FIG. 5, the apparatus of acquiring images created by penetration of a radioactive ray according to the present exemplary embodiment may collect radioactive rays irradiated by a source in operation S501, and generate a light signal in response to the collected radioactive rays in operation S502. For this purpose, the apparatus may include a medium for generating the light signal from the radioactive ray in terms of collecting an initial radioactive ray, and the medium may include at least one of NaI(Tl), CsI(Tl), LiI(Eu), ZnS(Ag), anthracene, plastics, and a liquid. Also, in operation S503, the apparatus may change an advancing direction of the generated light signal, and condense the generated light signal in the light receiving unit. For this purpose, the apparatus may include another medium for changing the advancing direction of the light signal. In this exemplary embodiment, the other medium may have a specific gravity different from that of the medium for collecting the initial radioactive ray. Here, the other medium may include at least one of NaI(Tl), CsI(Tl), LiI(Eu), ZnS(Ag), anthracene, plastics, and a liquid, and also may be an immaterial type such as a vacuum state or the air. Specifically, an element may be used as the other medium as long as the element is able to change the advancing direction of the light signal through a reaction with the light signal.

When the side of the medium collecting the initial radioactive ray is formed into a concave shape, the advancing direction of the light signal may be changed to a direction of a light receiving sensor even without additionally forming another medium. For an example, when a side surface of the medium, collecting the initial radioactive ray, adjacent to the light receiving sensor is formed into the concave shape, the advancing direction of the generated light signal may be changed to the direction of the light receiving sensor.

Even in this exemplary embodiment, the concave shape may be laterally asymmetrical with respect to a location of the light receiving unit.

The light signal condensed in the light receiving sensor due to a change in a density may be converted into an electrical signal in operation S504, and the converted electrical signal is penetrated to an inspection target to acquire a penetration image based on characteristics of the collected radioactive rays in operation S505.

As described above, in the apparatus of acquiring images created by penetration of a radioactive ray according to an exemplary embodiment, a major part of the light signal generated from the irradiated radioactive ray may be used in acquiring images, thereby obtaining high quality images with a relatively high contrast. In addition, in the method of acquiring images created by penetration of a radioactive ray according to an exemplary embodiment, penetration images of the inspection target may be obtained even using a relatively small amount of exposure, thereby reducing maintenance costs, and minimizing damage incurred by the inspection target due to exposure of the radioactive ray. Also, only the shape of the scintillator may vary to change the advancing direction of the generated light signal to the direction of the light receiving sensor, thereby enabling design and embodiment of the apparatus at low costs.

The method of acquiring images created by penetration of a radioactive ray may be recorded, stored, or fixed in one or more computer-readable media that includes program instructions to be implemented by a computer to cause a processor to execute or perform the program instructions. The media may also include, alone or in combination with the program instructions, data files, data structures, etc. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, etc. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the exemplary operations and methods described above, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. An apparatus of acquiring images created by penetration of a radioactive ray, the apparatus comprising:
    a scintillator to generate a light signal in response to an irradiated radioactive ray, and to change an advancing direction of the light signal;
    a light receiving unit to receive the light signal whose advancing direction is changed; and
    a signal processing unit to convert the received light signal into an electrical signal, and acquire an image corresponding to the penetrated irradiated radioactive ray based on the converted electrical signal,
    wherein the scintillator includes a medium having a density different from a density of the surrounding air,
    wherein the light signal from the scintillator enters another medium different from the medium of the scintillator before entering the light receiving unit,
    wherein the another medium surrounds at least three sides of the light receiving unit, and
    wherein a side surface of the scintillator adjacent to the light receiving unit is formed into a concave shape, the concave shape being laterally asymmetrical with respect to a location of the light receiving unit.

2. The apparatus of claim 1, wherein the scintillator changes the advancing direction of the generated light signal to a direction of the light receiving unit according to a formed shape of the scintillator.

3. The apparatus of claim 1, wherein the scintillator changes the advancing direction of the light signal to a direction of the light receiving unit based on the concave shape.

4. The apparatus of claim 1, wherein another side surface of the scintillator is formed into a convex shape, wherein the another side surface is exposed to the irradiated radioactive ray.

5. The apparatus of claim 1, wherein the scintillator is formed in a circular arc shape.

6. An apparatus of acquiring images created by penetration of a radioactive ray, the apparatus comprising:
    a scintillator comprising a first medium to generate a light signal and a second medium to change an advancing direction of the light signal;
    a light receiving unit to receive the light signal whose advancing direction is changed; and
    a signal processing unit to convert the received light signal into an electrical signal, and acquire an image corresponding to the penetrated irradiated radioactive ray based on the converted electrical signal;
    wherein the second medium changes the advancing direction of the light signal towards a direction of the light receiving unit based on a difference between a density of the first medium and a density of the second medium,
    wherein the light signal from the scintillator enters another medium different from the first medium and the second medium of the scintillator before entering the light receiving unit,
    wherein the another medium surrounds at least three sides of the light receiving unit, and
    wherein a side surface of the first medium that contacts the second medium is formed into a concave shape, the concave shape being laterally asymmetrical with respect to a location of the light receiving unit.

7. The apparatus of claim 6, wherein at least one of the first medium and the second medium includes at least one of NaI(Tl), CsI(Tl), LiI(Eu), ZnS(Ag), anthracene, plastics, and a liquid.

8. The apparatus of claim 6, wherein the second medium is a gas or vacuum.

* * * * *